(No Model.)

S. E. HOWELL.
TUBE FOR BOILERS, &c.

No. 406,140. Patented July 2, 1889.

Witnesses.
Rob.t F. Drury
Bernard E. Drury

Inventor:
S. Earnshaw Howell

UNITED STATES PATENT OFFICE.

SAMUEL EARNSHAW HOWELL, OF SHEFFIELD, COUNTY OF YORK, ENGLAND.

TUBE FOR BOILERS, &c.

SPECIFICATION forming part of Letters Patent No. 406,140, dated July 2, 1889.

Application filed December 10, 1888. Serial No. 293,076. (No model.)

*To all whom it may concern:*

Be it known that I, SAMUEL EARNSHAW HOWELL, a subject of the Queen of Great Britain, and a resident of Sheffield, in the county of York, England, have invented certain new and useful Improvements in Tubes for Steam-Boilers, Surface Condensers, and other like apparatus in which tubes are used; and I do hereby declare that the following is a full, clear, and exact description thereof, reference being had to the accompanying drawings, which form a part of this specification.

My invention relates to improvements in tubes for steam-boilers, surface condensers, and other like apparatus in which tubes are used, the object of said improvements being to construct one or each of the ends of such tubes with an internal tubular portion of hard metal and an external tubular portion of ductile metal tightly united with each other. For example, I apply to the ends of steel tubes an external sleeve of a ductile metal—such as copper—and to the ends of copper tubes I apply an internal covering of steel or other hard metal. The external ductile metal protects the tube-plate and the internal hard metal resists the action of the fire. The advantages of both metals are thus combined.

I carry my invention into practice, as illustrated in the accompanying drawings, in which—

Figure 1:
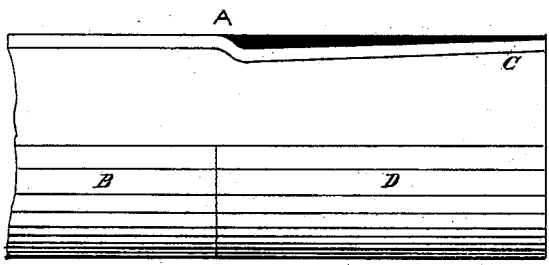
Figure 2:
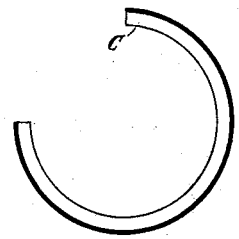
Figure 3:
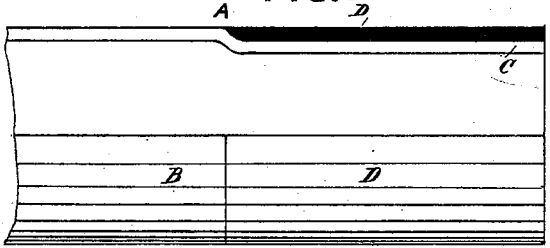
Figure 4:
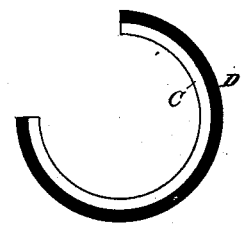
Figure 5:
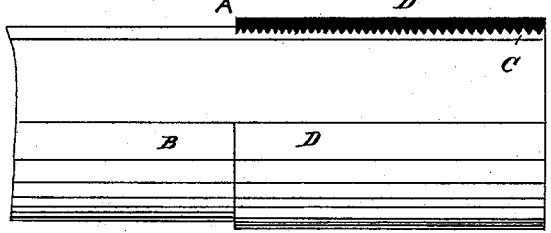
Figure 6:
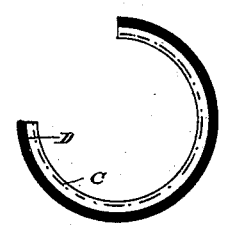
Figure 7:
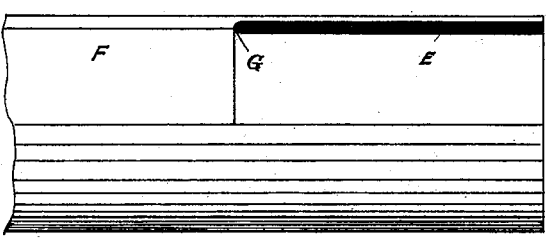
Figure 8:
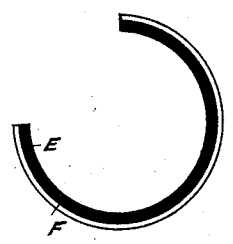

Figure 1 represents the end of a tube, partly in longitudinal section, provided with a sleeve of ductile metal according to this invention. Fig. 2 represents an end view of same. Figs. 3 and 4 represent like views of a sleeved tube illustrating a modification of the invention. Figs. 5 and 6 represent like views of a sleeved tube illustrating another modification. Figs. 7 and 8 are like views representing an internal sleeve of steel applied to a copper tube.

In supplying the external tubular portion of ductile metal I form a circumferential shoulder A near the extremity of a steel tube B, such as are used in the construction of locomotive-boilers. For example, I should reduce the end of a two-inch tube from about three inches from the end one-eighth of an inch in diameter, either by compression, which would also reduce the internal diameter, as illustrated by Figs. 1 to 4, inclusive, or by reducing only the outside metal or surface of the tube by cutting it away, or by other suitable process, as illustrated by Figs. 5 and 6. By any of these processes a circumferential shoulder A would be left at the junction of the two diameters upon the pipe or tube B. The reduced end C of the tube B is preferably non-cylindrical, as illustrated by Figs. 1 and 2, where it tapers inward to the shoulder. It may alternatively be corrugated or grooved, as shown in Fig. 5. In the modification illustrated by Figs. 3 and 4 the reduced end is cylindrical. Upon such reduced end C, I place a tubular sleeve D, preferably of soft copper, and I draw it down (by the ordinary process of passing it through a draw-plate,) so that it completely covers the reduced end and tightly abuts against the said shoulder A. The sleeve should in all cases be drawn against or toward the shoulder. The sleeve is conveniently drawn down to the diameter of the tube, as illustrated by Figs. 1 to 4; but this is not considered essential. Consequently, I have shown in Figs. 5 and 6 a sleeve which projects somewhat. The process of "drawing" the sleeve D causes it to be tightly compressed upon the reduced end C and to grip the same with great power. I may, when desirable, secure the sleeve upon the end of the tube by expanding the tube into the sleeve by the application of internal force in conjunction with the process of drawing down the sleeve.

By the means hereinbefore described I produce tubes of steel, for example, having one or both ends covered for a suitable distance with a ductile compressible metal firmly fixed upon and closely adhering to the tube and well adapted to the purpose of making a water-tight joint without damaging the tube-plate into which the tubes are fixed.

I am aware that it is not broadly new to provide the ends of such tubes with sleeves or external coatings of ductile metal, and I hereby disclaim the broad idea.

My improved sleeve is drawn *in situ*, and is thus not only shrunk upon, but is consolidated with the steel tube, so that practically there is a perfect joint between the sleeve and the tube that is absolutely steam-tight, and calking is not necessary or requisite. A non-cylindrical shape of the reduced end of the tube, such as above described, prevents any sliding movement of the drawn sleeve upon the tube owing to or that otherwise might result from expansion and contraction by heat and cold.

In covering the interior of the end of a ductile tube with a protecting sleeve of harder metal—as, for example, applying a steel lining E, Figs. 7 and 8, to a copper tube F to protect the copper from the fierce action of the fire at the furnace end of the tube—I use the same process of drawing with like advantages; but in this case I draw the copper tube upon the steel or other hard-metal internal sleeve. The diameter of the sleeve E may be such that when the tube F is drawn down to the required diameter a shoulder is formed at G. This shoulder is not, however, essential.

What I therefore claim as my invention, and desire to secure by Letters Patent of the United States, is—

1. A metallic tube for steam-boilers and other like apparatus, having an end constructed with an internal tubular portion of hard metal and an external drawn tubular portion of ductile metal, the latter fast upon and consolidated with the metal of the former, as hereinbefore specified, for the purposes set forth.

2. A metallic tube for steam-boilers and other like apparatus, constructed with a reduced end, and provided with a drawn sleeve of ductile metal fast on said reduced end and consolidated with the metal of the tube, substantially as hereinbefore specified.

3. A metallic tube for steam-boilers and other like apparatus, constructed with a non-cylindrical reduced end, and provided with a drawn sleeve of ductile metal fast on said reduced end and consolidated with the metal of the tube, as hereinbefore specified, for the purpose set forth.

In testimony that I claim the foregoing as my own I have affixed hereto my signature, in presence of two witnesses, this 5th day of October, 1888.

S. EARNSHAW HOWELL.

Witnesses:
ROB. F. DRURY,
EUSOO D. DRURY.